No. 643,088. Patented Feb. 6, 1900.
G. T. GLOVER.
LUBRICATING DEVICE.
(Application filed June 4, 1897.)
(No Model.)

Witnesses:
A. F. Durand.
R. M. Wagner.

Inventor:
George T. Glover
by Page & Belfield
Attys.

THE NORRIS PETERS CO., PHOTO-LITHO., WASHINGTON, D. C.

United States Patent Office.

GEORGE T. GLOVER, OF CHICAGO, ILLINOIS.

LUBRICATING DEVICE.

SPECIFICATION forming part of Letters Patent No. 643,088, dated February 6, 1900.

Application filed June 4, 1897. Serial No. 639,442. (No model.)

*To all whom it may concern:*

Be it known that I, GEORGE T. GLOVER, a citizen of the United States, residing at Chicago, in the county of Cook and State of Illinois, have invented a certain new and useful Improvement in Lubricating Devices, of which the following is a specification.

My invention relates to means for lubricating the contacting or wearing surfaces of a stationary shaft or axle and an inclosing or surrounding rotary member, such as a sleeve or collar.

The principal objects of my invention are to permit the quick, easy, and effective application of the lubricating material, such as oil or grease, to such wearing-surfaces without necessitating the removal or stoppage of the inclosing rotary member and to arrange for the convenient repetition of such applications from time to time as desired.

To such end my invention consists in matters hereinafter set forth.

Figure 1:
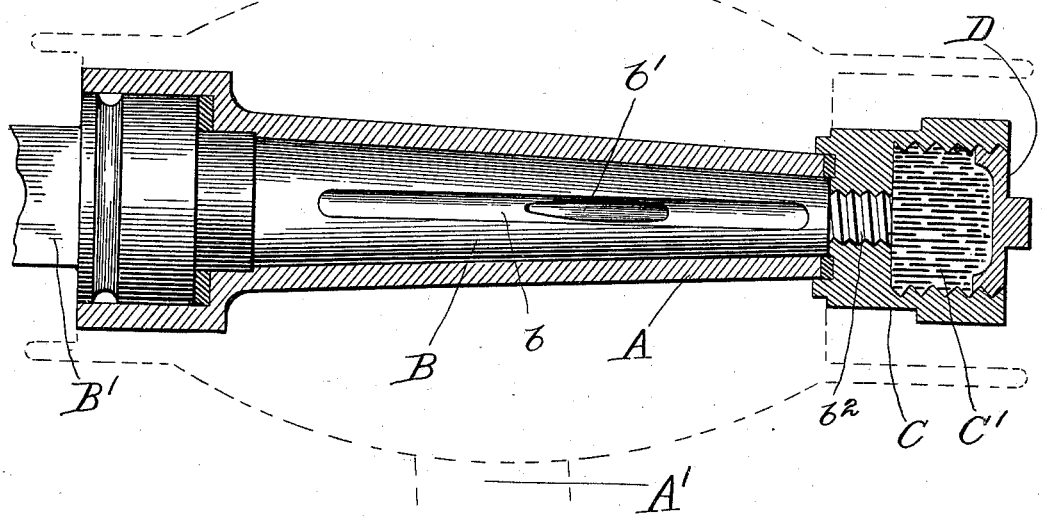
Figure 2:
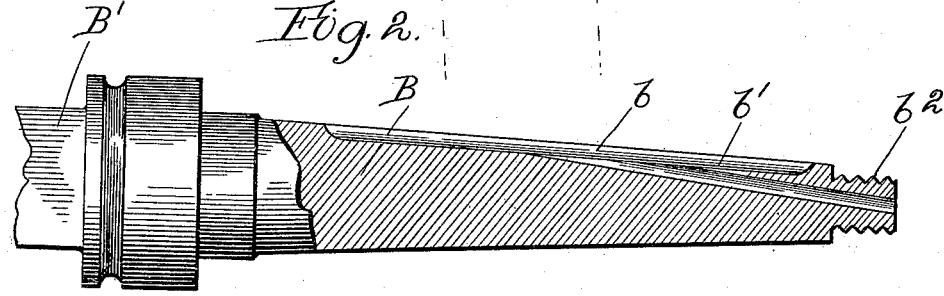
Figure 3:
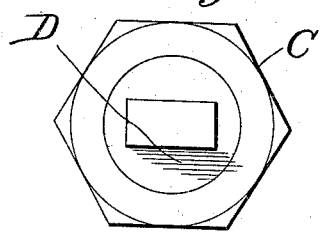

In the accompanying drawings, Figure 1 is a view illustrating the application of my invention to a wheel and axle therefor, a hub portion of the wheel being shown partly in section and partly in dotted lines and one end portion of the axle in elevation. Fig. 2 is a longitudinal section of such axle end portion with the retaining-nut detached, and Fig. 3 is an end elevation of the retaining-nut.

In the drawings I have shown the rotary tapered hub-sleeve A of the wheel A' fitted upon and inclosing a correspondingly-tapered end portion B of a stationary or rigidly-attached axle B'. This tapering axle portion B is desirably provided with a longitudinal lubricating-groove $b$, formed upon its upper surface, and has a duct or passage $b'$ formed in it, preferably between its outer end and some point in the groove $b$, but preferably a point between the latter's middle and outer end. By such arrangement lubricating material, such as oil or grease, can be forced into the duct $b'$ and through the same into the groove $b$, whereupon it will be spread between and coat the wearing-surfaces of the axle portion B and the hub-sleeve A by the rotation of the latter.

The hub-sleeve A is held in place so as to keep the wheel upon the axle by a retaining-nut C, which fits upon the reduced and screw-threaded end $b^2$ of the axle B'. This retaining-nut C has a bore C' formed from its outer side inwardly to an extent to communicate with the end of the axle-duct $b'$ when it is in position upon the screw-threaded axle end $b^2$. This bore C' can therefore serve as a chamber for the lubricating material and so permit a suitable supply of the same to be kept readily accessible to the duct or passage $b'$. As a preferred arrangement the chamber C' is made considerably larger in diameter than the threaded end $b^2$ of the axle B, in which way the chamber C' can be suitably large to contain a sufficient quantity of oil or grease, while at the same time the threaded end portion $b^2$ can be suitably reduced in size. As a convenient means for forcing the lubricating material from the chamber thus formed into the axle duct or passage $b'$ the bore C' can be screw-threaded and a correspondingly-threaded screw-plug D can be fitted within such bore and screwed into and out of the same, as desired, it being understood that the retaining-nut C is screwed upon the threaded axle end $b^2$ to an extent to cause it to be practically locked thereupon, and so allow the independent manipulation of the screw-plug D. This arrangement constitutes a simple and efficient means for allowing the quick and easy application of lubricating material to the wearing-surfaces of the axle and inclosing sleeve, while it at the same time permits such material to be conveniently applied repeatedly by simply turning the screw-plug D a portion of a revolution.

The duct $b'$ could of course be formed in any suitable manner; but as a preferred arrangement it comprises a single passage-way which extends between the outer end of the threaded portion $b^2$ and the wearing-surface of the axle in a straight line and at an inclination relatively to the length of the axle, as best shown in Fig. 2. In this way the axle is not weakened by the duct and oil or grease is prevented from clogging in the latter.

The plug D need not be screw-threaded, but could be fitted simply within an unthreaded bore of the lubricating-chamber and could be driven into the latter from time to time as the lubricating material is needed. It is preferably screw-threaded, however, as shown, and the threads are desirably so arranged that the plug is screwed into the lubricating-chamber by being turned in the same direction in which the retaining-nut C is turned when it is screwed upon the axle, whereby the turning of the screw-plug tends to tighten the retaining-nut C upon the axle.

What I claim is—

The combination of a wheel-axle having a longitudinal groove formed upon its upper surface, and having also a straight and oblique duct $b'$ which leads upwardly from its end and which opens into the said groove at a point between the latter's ends; and a hollow retaining-nut screwed upon the end of said axle, and provided with an adjustable plug whereby the oil in the nut may be forced through the said straight and oblique duct $b'$ and from the latter into the aforesaid longitudinal groove.

GEORGE T. GLOVER.

Witnesses:
A. F. DURAND,
R. M. WAGNER.